Figure 1:
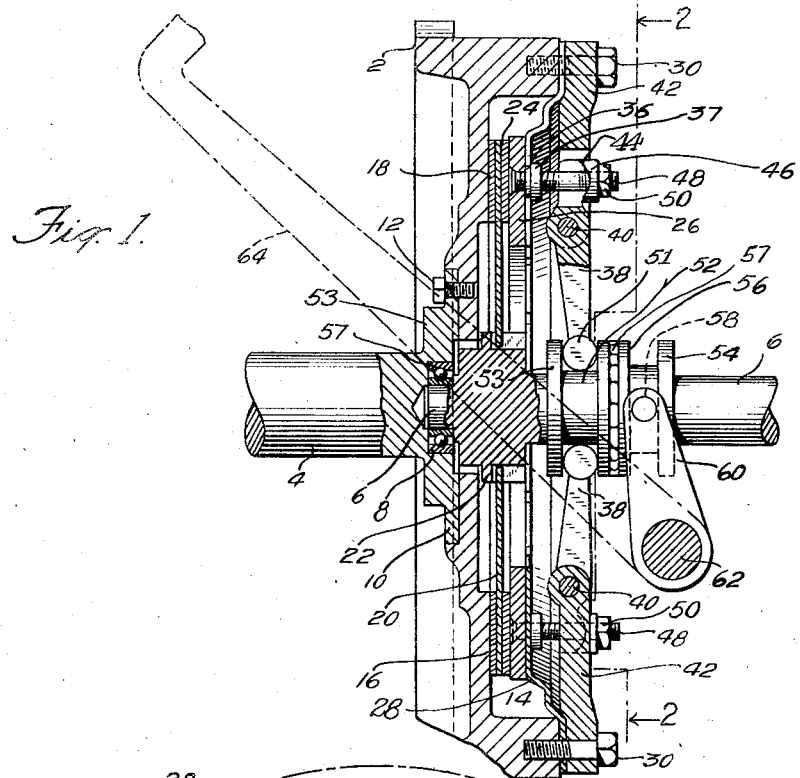

Jan. 7, 1936.   G. S. LANE   2,026,945
CLUTCH MECHANISM
Filed Oct. 22, 1931

INVENTOR
GEORGE S. LANE.
BY HIS ATTORNEYS

Patented Jan. 7, 1936

2,026,945

UNITED STATES PATENT OFFICE 2,026,945

CLUTCH MECHANISM

George S. Lane, Passaic, N. J., assignor to Raybestos-Manhattan, Inc., a corporation of New Jersey Application October 22, 1931, Serial No. 570,353

6 Claims. (Cl. 192—68)

This invention relates to clutch mechanisms and more particularly to clutch mechanisms of the type in common use in automobiles.

The principal objects of the invention are to improve the construction and mode of operation of clutch mechanisms of this type and to provide a clutch construction that is simpler and more compact and can be manufactured at less cost than prior constructions.

With these and other objects in view, the invention consists in a clutch embodying the novel and improved features, constructions, and combinations of parts hereinafter described and particularly pointed out in the claims, the advantages of which will be readily understood and appreciated by those skilled in the art.

The invention will be clearly understood from the accompanying drawing illustrating the invention in its preferred form and the following detailed description of the construction therein shown.

Figure 2:
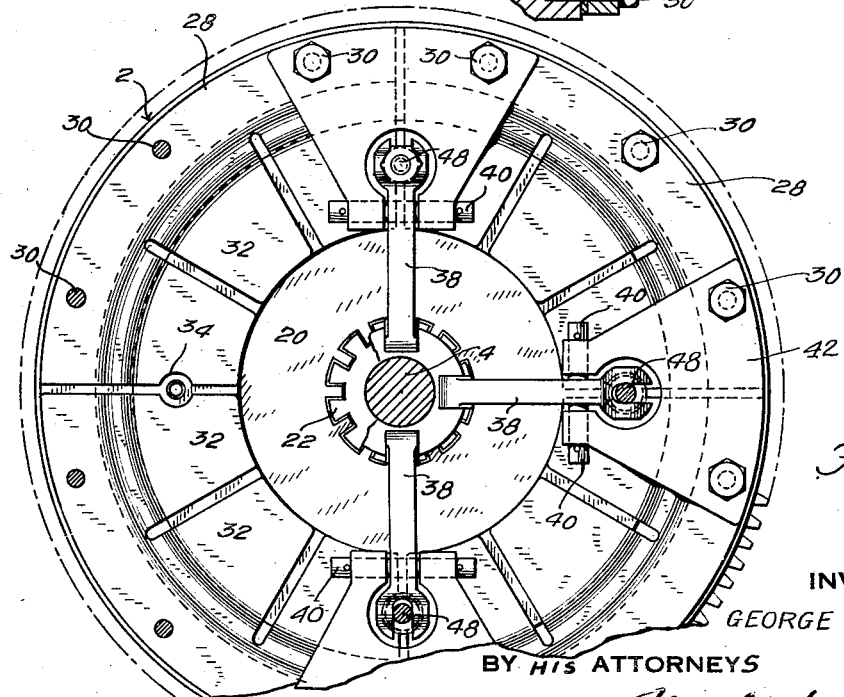

In the drawing:

Fig. 1 is a view principally in axial section of a clutch mechanism embodying the invention; and Fig. 2 is a view in elevation of said mechanism taken in the direction of the axis of the clutch substantially on the line 2—2 of Fig. 1.

In the construction shown in the drawing the invention is embodied in a mechanism comprising an automobile fly wheel indicated at 2, secured to the rear end of the crankshaft 4 of the automobile engine. Axially aligned with the crankshaft 4 is a shaft 6 which is driven from the crankshaft 4 through the clutch.—As shown the forward end of the shaft 6 is supported upon ball bearings 8 mounted in the recess in the rear end of the crankshaft 4. The fly wheel 2 is secured to a flange 10 on the rear end of the crank shaft by means of a series of bolts 12.

As clearly shown in the drawing, the fly wheel 2 is provided on its rear side with a recess 14 in which are mounted certain of the parts of the clutch. The fly wheel is provided at the bottom of the recess with an annular contact face 16 which is adapted to be engaged by a corresponding contact face on a ring 18 of friction material attached to the periphery of a clutch disc 20. This clutch disc is splined to an enlargement 22 on the shaft 6 so that it is axially movable with relation to said shaft.

The clutch disc 20 carries on its opposite side a ring 24 of friction material having an outer contact face arranged to be engaged by the opposed contact face of a ring shaped pressure plate 26. As will be noted from an inspection of Fig. 1 the clutch disc 20 and the pressure plate 26 are both arranged within the recess in the fly wheel.

The pressure plate 26 is supported upon a series of actuating spring plates 28 secured to the periphery of the fly wheel. Fig. 2 shows in elevation the form of these spring plates and Fig. 1 shows the form of the plates in cross section. These spring plates are secured to the periphery of the fly wheel by means of a series of bolts 30. The plates are so bent that they extend inwardly and to the left, Fig. 1, into the recess 14 in the fly wheel and are each provided with a series of inwardly projecting spring tongues 32 formed by slots in the plate. Each of these plates, in side elevation has substantially the shape of the sector of a circle with the inner portion of the sector cut away on an arc substantially concentric with the periphery thereof. In the construction shown in the drawing there are four of these plates, each plate extending substantially 90° about the axis of the fly wheel.

The inwardly extending tongues 32 of the spring plates engage the outer face of the pressure plate 26 in the manner shown particularly in Fig. 1. The ends of the spring plates are formed with recesses 34 in which are received bosses 36 projecting laterally from the pressure plate on the outer side thereof. The pressure plate is secured to the springs by means of bolts or pins 48 passing through the pressure and spring plates and each having a nut 37 threaded thereon and engaging the ends of the adjacent spring plates.

Thus the pressure plate 26 is supported by the spring plates 28 within the recess 14 in the fly wheel and the spring plates act on the pressure plate to press the same yieldingly against the clutch disc 20 and thereby frictionally engage the disc between the opposed faces of the pressure plate and the fly wheel. This establishes a driving connection between the fly wheel and the shaft 6.

The pressure plate 26 is moved outwardly against the pressure of the spring plates 28 to disengage the clutch. The mechanism for thus moving the pressure ring comprises a series of levers 38 respectively pivoted upon pivot pins 40 within the slots in supporting plates 42 secured to the periphery of the fly wheel. Each of the levers is provided with a rounded face 44 arranged to engage a correspondingly shaped face on a collar 46 mounted on the corresponding bolt 48 which is secured to the pressure plate as stated above. Each of the collars 46 is loose on the corresponding pin and engages a nut 50 threaded on the pin. These nuts provide an adjustable connection between the levers 38 and the pressure plate.

The inner ends of the levers 38 are provided with enlarged rounded bearing portions 51 which engage in a groove 52, in a collar 53 mounted on the shaft 6 for movement axially on the shaft. This collar is arranged to be actuated by a second collar 54 provided with a groove 56 within which engage rolls 58 carried by the forked end of an arm 60 attached to a shaft 62. The collar 53 is separated from the collar 54 by ball bearing 57. To this shaft is attached a second arm 64 on the upper end of which is mounted a treadle (not shown).

With the above construction, when the treadle arm 64 is depressed the shaft 62 is turned and the arm 60 is swung about the axis of said shaft to move the collar 54 to the left (Fig. 1). By this movement of the collar the levers 38 are actuated to move the pressure ring 26 to the right (Fig. 1), to disengage the clutch. The spring action of the spring plates 28 forces the pressure ring to the left (Fig. 1) thereby pressing the pressure plate into firm frictional engagement with the friction ring 24 on the friction disc 20 and forcing the other friction ring 18 on said disc firmly into engagement with the opposed contact face of the fly wheel. Thus a reliable driving connection is established between the fly wheel and the shaft 6.

It will be noted that the clutch illustrated and described above is comparatively simple in construction and that the parts are very compactly arranged. The clutch disc 20 and the pressure ring and the greater part of each of the actuating springs 28 are located within the recess 14 in the fly wheel and the entire clutch mechanism projects only a short distance to the rear of the fly wheel. The clutch actuating mechanism is of the "push-in" type constructed and arranged to actuate the pressure plate to disengage the clutch by a movement of the collar 54 toward the fly wheel.

It is to be understood that the invention is not limited to the particular construction and arrangement of parts of the illustrated embodiment of the invention but that the invention may be embodied in other forms within the scope of the claims.

Having explained the nature and object of the invention and having specifically described a construction embodying the invention in its preferred form, what is claimed is:

1. A clutch mechanism comprising in combination a driving member and a driven member relatively movable axially toward and from each other, a flexible resilient spring plate tending to move said members relatively in one direction axially, said plate being located and shaped to form a housing element for the clutch, a device movable along the axis of the driving and driven members in a direction toward said members to relieve the engagement between said members to throw out the clutch, and mechanism for actuating the said device.

2. A clutch mechanism comprising a fly wheel having a recess, a driven shaft axially aligned with the fly wheel, a shiftable clutch disc slidably mounted on the driven shaft within the said recess and arranged to move longitudinally of the shaft and to engage a contact surface carried on the fly wheel, a pressure plate mounted in said recess, sheet metal spring plates attached to the fly wheel and carrying said pressure plate, said spring plates acting to move the pressure plate in one direction to close the clutch and means to move the pressure plate longitudinally in the opposite direction to open the clutch.

3. A clutch mechanism comprising a fly wheel, a driven shaft axially aligned with the fly wheel, a shiftable clutch disc mounted on said shaft for rotation with the shaft and movable longitudinally of the shaft, a pressure plate arranged to engage said clutch disc, a series of spring plates mounted on the fly wheel and attached to said pressure plate to support the same and acting to move the pressure plate to close the clutch, and one or more rigid levers pivotally mounted on the fly wheel for actuating the pressure plate to disengage the same from the clutch disc to thereby open the clutch.

4. A clutch mechanism comprising a fly wheel, a driven shaft axially aligned with the fly wheel, a clutch disc mounted on the driven shaft for rotation therewith and movable longitudinally of the shaft, a pressure plate arranged to engage said clutch disc, spring plates attached to the fly wheel and supporting the pressure plate, said spring plates also acting to move the pressure plate to close the clutch, a collar movable longitudinally of the shaft and one or more levers actuated by the collar and connected with the pressure plate to move the same in the reverse direction to open the clutch.

5. A clutch mechanism comprising a fly wheel having a recess, a clutch disc mounted in the recess in the fly wheel, a pressure plate also mounted in said recess and spring plates formed of sheet metal mounted on the fly wheel and extending into said recess for supporting the pressure plate and for moving the same axially in one direction to close the clutch.

6. A clutch mechanism comprising two driving clutch members relatively movable in the direction of the axis of rotation, a driven clutch member located between said driving clutch members, one or more spring plates attached to one of the driving clutch members, and supporting the other driving clutch member for pressing said driving clutch members toward each other to close the clutch, and one or more operating levers pivoted on the former driving clutch member for relatively actuating said driving clutch members to open the clutch.

GEORGE S. LANE.